Figure 1:
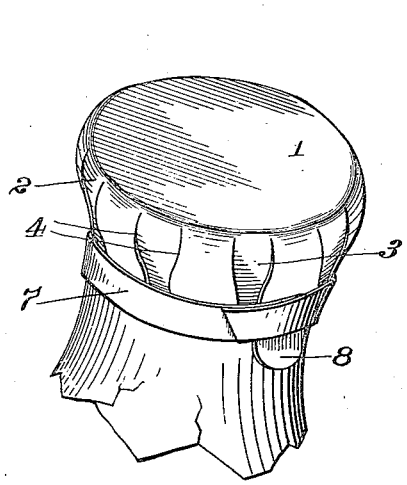

T. S. BELL.
BOTTLE CAP.
APPLICATION FILED JUNE 15, 1915.

1,214,746.

Patented Feb. 6, 1917
2 SHEETS—SHEET 1.

Inventor
Thomas S. Bell
By
Attorney

Witnesses

T. S. BELL.
BOTTLE CAP.
APPLICATION FILED JUNE 15, 1915.

1,214,746.

Patented Feb. 6, 1917.
2 SHEETS—SHEET 2.

Witnesses

Inventor
Thomas S Bell
By Edwin F. Samuels
Attorney

UNITED STATES PATENT OFFICE.

THOMAS S. BELL, OF BALTIMORE, MARYLAND.

BOTTLE-CAP.

1,214,746.

Specification of Letters Patent.

Patented Feb. 6, 1917.

Application filed June 15, 1915. Serial No. 34,158.

*To all whom it may concern:*

Be it known that I, THOMAS S. BELL, a citizen of the United States of America, residing in the city of Baltimore, State of Maryland, have invented certain new and useful Improvements in Bottle-Caps, of which the following is a specification.

The use of a paper disk forced into a rabbet or groove in the lip or mouth of the bottle as a closure for milk bottles is well-known, but in recent years, the increased attention given to sanitary conditions and the demand for purity in connection with all food products has resulted in widespread criticism of this method of packing milk. The fact has been pointed out that with this class of closure the milk is apt to leak around the edge of the cap and attract flies and various pests, and later in opening the bottle, the accumulation of dirt, filth and germs is apt to be introduced into the contents of the bottle. Also, the hands come in contact with the lip over which the milk is poured so that under no circumstances, can the milk thus bottled be said to be in a highly sanitary condition when it finally reaches the table. In addition to what may be termed the normal accumulation of dirt and germs, it often happens that the driver or some other attendant desiring milk for his own consumption or having an opportunity to sell it, removes the caps, takes out a portion of the milk, fills up the bottles with water and replaces the caps. Under these circumstances, the chance for accumulation of dirt and germs is largely increased. The adulteration of the commodity is a lesser consideration. The attendant is not apt to be careful in the selection of the water used as an adulterant, and further, he opens and closes the bottle hastily, and probably carelessly, under unfavorable conditions, and the introduction of dirt of all sorts is a necessary incident. With these facts in view, numerous attempts have been made to produce a sanitary milk bottle cap. The best known of these is a metal cap in the form of a sheet metal plate laid over the mouth of the bottle and crimped at the edge to inclose the lip. While such caps are in a way superior to the old paper disks which permit the milk to leak around the edges and stand in a puddle in the depression formed by the groove in which the paper disk is seated, they are expensive, are rather difficult to remove and require a special tool which cannot always be kept at hand, and they do not cover a sufficiently large portion of the bottle neck to prevent the accumulated dirt from getting into the milk which it will be noted flows well back from the lip when it is poured. To overcome these various difficulties, I have provided a paper cap which incloses not only the mouth and the lip of the bottle, but a sufficient portion of the neck to prevent the dirt deposited on the bottle from the outside air from entering the milk when it is opened. The portions of the bottle in the vicinity of the opening are so completely covered that there is no chance whatever for any portion of the bottle which has not been covered to be washed by the milk when it is poured, and the cap is so designed that it can be made and applied without contact with the hands of the operator. In addition to this, the cap is so arranged that it is conveniently removed without any necessity for using a tool or forcing the cap loose with the fingers, or for introducing the fingers under the cap so that they may be wet by the milk, and further, the cap when once removed is completely destroyed, being torn from side to side so that it cannot be replaced without the fact being evident that the package has been opened. It is therefore utterly impossible for an attendant to remove a portion of the milk and then sell the package without the nature of the transaction being apparent. In addition to this, the cap can be produced and applied with excessive rapidity at an exceedingly small cost.

In the accompanying drawing I have illustrated a milk bottle cap constructed in accordance with my invention, showing the device in several different forms, modified as to certain features of the invention.

Figure 4:
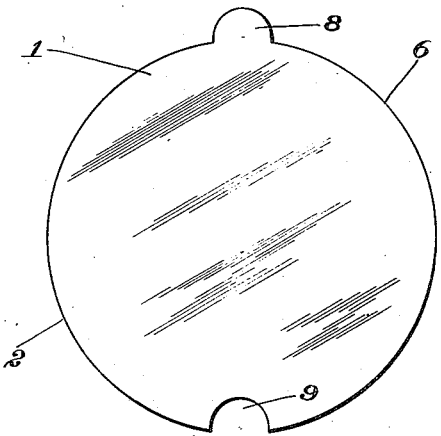
Figure 2:
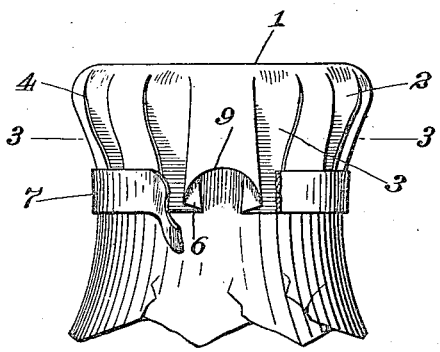
Figure 5:
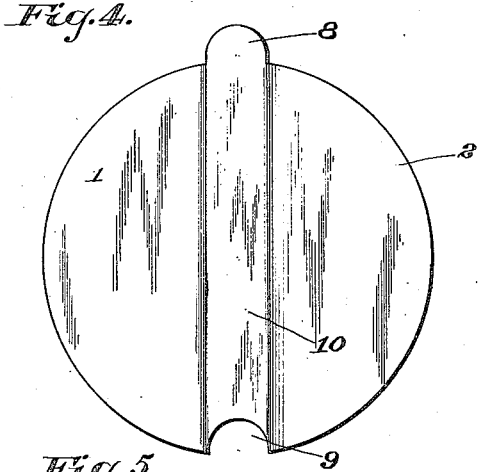
Figure 3:
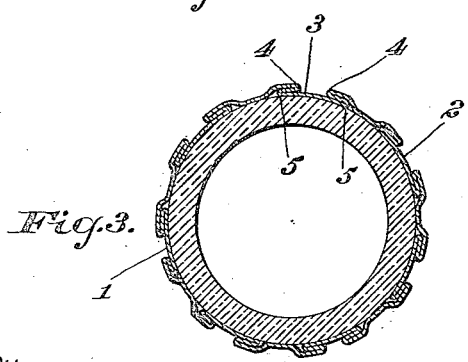
Figure 6:
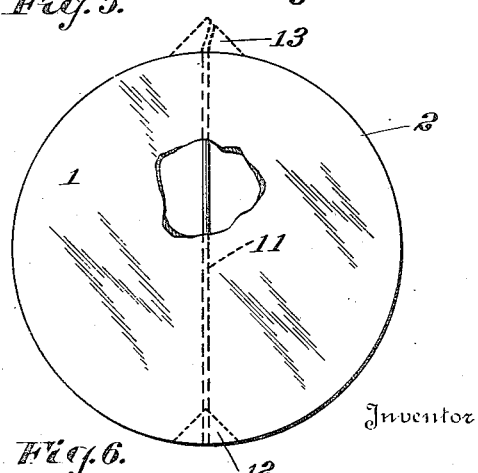
Figure 7:
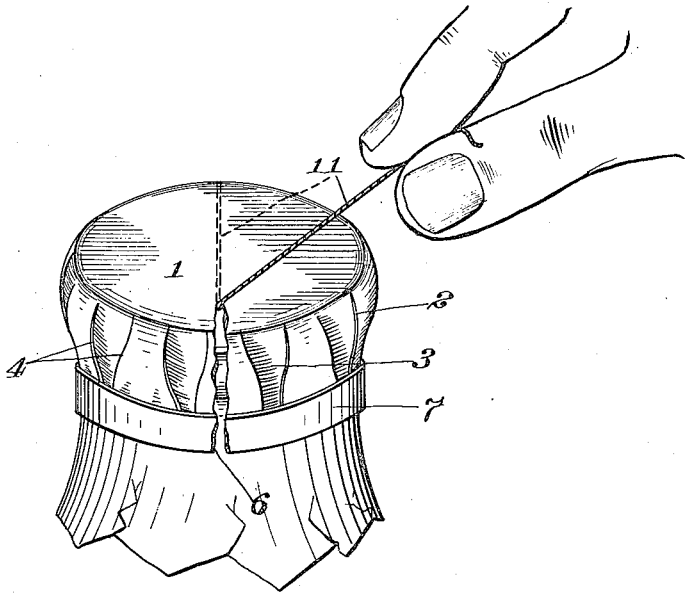
Figure 8:
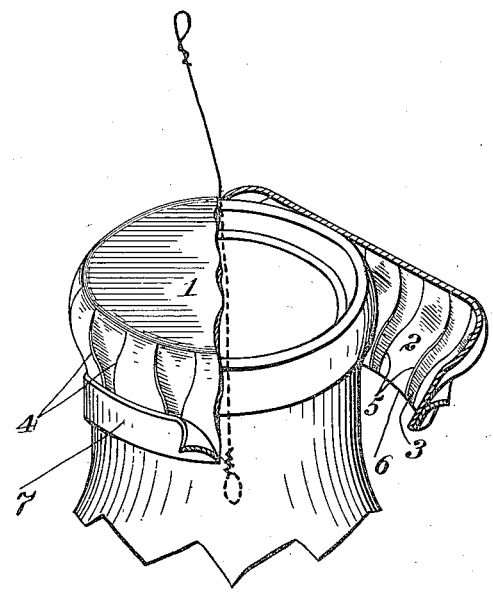

In the drawing, Figure 1 is a perspective view of a milk bottle neck with the cap applied; Fig. 2 is an elevation with a portion of the band removed to show the notched edge of the cap; Fig. 3 is a section on the line 3, 3 of Fig. 2; Fig. 4 is a plan of a blank of one type; Fig. 5 shows a slightly different form of blank; Fig. 6 shows still another form, the blanks being shown in Figs. 4, 5 and 6 on a reduced scale; Fig. 7 shows a cap partly destroyed in removing; and Fig. 8 shows a cap completely destroyed.

Referring to the drawings by numerals; the cap in the form of the invention shown consists of a substantially circular blank 1, of diameter approaching twice that of the outside diameter of the bottle at the lip, laid over the mouth of the bottle, the circular margin or annular, circumferential portion 2 being crimped to form a skirt completely inclosing the lip and the upper portion of the bottle neck. In order that the paper at the periphery or lower edge of the skirt may lie flat against the surface of the bottle and be evenly distributed, thus preventing leakage, a type of crimping or plaiting has been evolved which may be termed a double Z fold. This is best illustrated in Fig. 3 which is a horizontal section showing each plait or crimp 3 having two outer vertices 4 and two inner vertices 5 so that each such crimp or plait comprises two Z folds, each having an outer and inner vertex 4, 5, making a double Z fold. This result is best accomplished by means of a plaiting or crimping die which forms no part of this invention and therefore is not illustrated, but it may in fact be accomplished by hand or otherwise within the scope of this invention. In order to hold the cap securely in position and to cause the periphery of the skirt portion 6 to hug tightly against the surface of the neck of the bottle and to maintain this relation of the parts, a circular band 7 of paper or the like is used. This band of paper or other suitable material is wound tightly around the bottle neck, encircling the periphery of the skirt one or more times and drawing it against the neck, the inner surface of the band being preferably coated with adhesive to hold the parts in their assembled relation.

The wide demand and extreme necessity for a cap which can be conveniently removed but which when once removed, cannot be replaced without having the fact that it has been removed and replaced conspicuously apparent, has been explained. The cap which is the subject of this invention is provided with means for serving this function. In Figs. 4 and 5, this is in the form of a tab 8 which projects below the peripheral band 7 and means diametrically opposite the tab 8 whereby the edge of the cap is at a single point fixedly secured to the surface of the bottle neck. The tab serves as a grip for the fingers by means of which the cap may be engaged to tear it, and a fixed point diametrically opposite is the point toward which the line of separation of the two parts extends when the cap is torn. If the tab and fixed point are arranged in the line of the grain of the paper, no other means is necessary and the cap may be torn in two, if, for instance, as is shown in Fig. 4, there be a notch at 9 which permits the paste on the band 7 to come directly in contact with the surface of the bottle. With a fixed point thus provided and a tab 8 arranged in the line of the grain of the paper, the band 7 may be severed and the cap torn into two parts by merely pulling on the tab. If for any reason this is not regarded as a sufficiently certain means for separating the cap into two parts and removing it, the paper from which the cap blanks are cut, as hereinafter described, may be provided with a thickened rib 10 connecting the tab 8 and the notch 9. This rib, particularly if it extends in the direction of the grain of the paper, forms a line of demarcation along which the cap and band may be easily torn. An alternative form is shown in Fig. 6 in which there is a wire thread, strip of cardboard, or other suitable material 11 extending across the cap from side to side; this may extend transversely to the grain or otherwise. All of these various means for determining the line of rupture are referred to broadly herein as the "tearing strand". In any instance, there may, if desired, be a tearing point provided by a notch 12 and a grip in the form of a tab 13, though these are not considered essential features, and in the form shown in Figs. 4 and 5, other means than the notches 9 may be used to provide a fixed tearing point.

Referring still to Figs. 4, 5 and 6, it will be noted that the cap blanks, as shown, are formed with the tabs 8 and notches 9 of precisely similar outline and diametrically opposite, so that in cutting the blanks, the tab of one blank fits into or forms the notch in the next, and the tab is thus cut without loss of paper as compared to a plain circular blank.

I have thus described my invention in various forms specifically and in detail in order that its nature and operation may be clearly understood; however, the specific terms herein are used in their descriptive rather than in their limiting sense and the scope of the invention is defined in the claims.

I claim—

1. A bottle cap in the form of a paper disk covering the mouth of the bottle and having a crimped skirt to inclose the lip and a considerable portion of the neck of the bottle, the disk having at its edge and at the end of a diameter extending in the direction of the grain of the paper, a tab serving as a grip to be used in tearing the cap in two to remove it.

2. A bottle cap in the form of a paper disk covering the mouth of the bottle and having a skirt to inclose the lip and a considerable portion of the neck of the bottle, the disk having a tab at the end of a diameter extending in the direction of the grain of the paper, and means for fixing the point diametrically opposite the tab to form a tearing point toward which the line of rupture extends when tension is applied to the tab.

3. A bottle cap in the form of a paper disk covering the mouth of the bottle and having a skirt to inclose the lip and a considerable portion of the neck of the bottle, the disk having a tab at the end of a diameter extending in the direction of the grain of the paper, means for fixing the diametrically opposite point to form a tearing point toward which the line of rupture extends when tension is applied to the tab, and a pasted paper band encircling the edge of the cap, drawn tight to cause the edge of the skirt to hug the neck of the bottle.

4. A bottle cap in the form of a paper disk covering the mouth of the bottle and skirted to inclose the lip and a large portion of the neck, the cap having a paper tab on one side and a notch on the other, and a pasted paper band encircling the periphery of the skirt to cause it to hug the bottle neck, the paste on the band engaging the bottle neck through the aperture formed by the notch to form a fixed point toward which the cap is torn when tension is applied to the tab.

5. A bottle cap in the form of a paper disk covering the mouth of the bottle and skirted to inclose the lip and a large portion of the neck, the cap having a paper tab on one side and a notch diametrically opposite in the direction of the grain of the paper, and a pasted paper band encircling the periphery of the skirt to cause it to hug the bottle neck, the paste on the band engaging the bottle neck through the aperture formed by the notch to form a stationary point toward which the cap is torn when tension is applied to the tab.

6. A bottle cap consisting of a paper blank covering the mouth of the bottle and skirted to inclose the lip and a considerable portion of the neck, a paper band drawn tightly around the periphery of the skirt and pasted to hold the skirt in close contact with the neck, and means for tearing the cap and severing the band, separating the cap into two substantially equal parts to remove it, including means for gripping the cap on one side and a fixedly secured point on the other side toward which to tear the cap.

7. A bottle cap consisting of a paper blank covering the mouth of the bottle and skirted to inclose the lip and a considerable portion of the neck, a paper band drawn tightly around the periphery of the skirt and pasted to hold the skirt in close contact with the neck, and means for tearing the cap and severing the band, separating the cap into two substantially equal parts to remove it, said means being in the form of a tearing strand extending diametrically across the blank.

8. A paper bottle cap having a tab on one side and a point on the other fixedly secured to the bottle forming a point toward which the line of rupture extends when tension is applied to the tab to remove the cap by tearing it in two.

9. A paper bottle cap having a tab on one side and a point on the other fixedly secured to the bottle, forming a point toward which the line of rupture extends when tension is applied to the tab to remove the cap by tearing it in two, the tab and fixed point being diametrically opposite in the direction of the grain.

Signed by me at Baltimore, Maryland, this 2nd day of June, 1915.

THOMAS S. BELL.

Witnesses:
ROBERT W. MAESER,
LILLIAN W. ABERCROMBIE.